(12) United States Patent
Dokic et al.

(10) Patent No.: US 10,914,199 B2
(45) Date of Patent: Feb. 9, 2021

(54) PIPING LAYOUT FOR WATER STEAM CYCLE SYSTEM OF COMBINED CYCLE POWER PLANT

(71) Applicant: GENERAL ELECTRIC COMPANY, Schenectady, NY (US)

(72) Inventors: Borislav Dokic, Nussbaumen (CH); Prashant Agrawal, Wettingen (CH)

(73) Assignee: General Electric Company, Schenectady, NY (US)

( * ) Notice: Subject to any disclaimer, the term of this patent is extended or adjusted under 35 U.S.C. 154(b) by 131 days.

(21) Appl. No.: 16/017,135

(22) Filed: Jun. 25, 2018

(65) Prior Publication Data

US 2019/0390575 A1    Dec. 26, 2019

(51) Int. Cl.
| | | |
|---|---|---|
| *F01K 13/00* | (2006.01) | |
| *F01K 23/10* | (2006.01) | |
| *F01K 13/02* | (2006.01) | |
| *F01K 3/18* | (2006.01) | |

(52) U.S. Cl.
CPC ............ *F01K 13/006* (2013.01); *F01K 3/185* (2013.01); *F01K 13/02* (2013.01); *F01K 23/106* (2013.01)

(58) Field of Classification Search
None
See application file for complete search history.

(56) References Cited

U.S. PATENT DOCUMENTS

| | | | | |
|---|---|---|---|---|
| 2001/0039796 A1* | 11/2001 | Bronicki | ............... | F01K 23/103 60/39.181 |
| 2002/0059792 A1* | 5/2002 | Oto | ...................... | F01K 23/106 60/39.182 |
| 2002/0116930 A1* | 8/2002 | Anderson | ............... | F01K 23/10 60/772 |
| 2003/0221409 A1* | 12/2003 | McGowan | ............... | F02C 3/30 60/39.17 |
| 2012/0011852 A1* | 1/2012 | Mundra | .................. | F01D 17/18 60/660 |
| 2015/0211387 A1* | 7/2015 | Shioyama | ............... | G05D 7/03 137/872 |
| 2016/0281543 A1* | 9/2016 | Arnold | .................. | F01K 23/106 |
| 2020/0131941 A1* | 4/2020 | Feng | ...................... | F01K 11/02 |

OTHER PUBLICATIONS

Collins, Hubert, Steam Turbines a Book of Instruction for the Adjustment and Operation of the Principal Types of this Class of Prime Movers (Year: 2016).*

* cited by examiner

*Primary Examiner* — Todd E Manahan
*Assistant Examiner* — Edwin Kang
(74) *Attorney, Agent, or Firm* — Charlotte Wilson; Hoffman Warnick LLC

(57) ABSTRACT

A piping layout for a water steam cycle (WSC) system of a combined cycle power plant is disclosed. The piping layout includes a first steam flow pipe delivering steam from a steam source to a high pressure (HP) segment of the ST system. The first flow pipe includes a first vertically oriented thermal expansion portion. The WSC system may also include a second steam flow pipe delivering steam from the steam source to an intermediate pressure (IP) segment of the ST system. It may also include a third steam flow pipe delivering steam from HP segment of the ST system to a steam source. The vertically oriented thermal expansion portion(s) may be positioned immediately upstream of the admission valve of the respective segment and/or immediately downstream from an outlet of the steam source.

12 Claims, 14 Drawing Sheets

PIPING LAYOUT FOR WATER STEAM CYCLE SYSTEM OF COMBINED CYCLE POWER PLANT

BACKGROUND OF THE INVENTION

The disclosure relates generally to combine cycle power plants (CCPP), and more particularly, to a piping layout for a water steam cycle system for steam turbine (ST) system of a CCPP.

Combined cycle power plants include a gas turbine system and a steam turbine system that work together to produce energy. The gas turbine system combusts a mixture of fuel with an air flow and directs it through a turbine to generate power. Exhaust from the gas turbine is used in a heat recovery steam generator (HRSG) to create steam that is directed to the steam turbine system to generate power. Piping carries the steam from the HRSG to the steam turbine system. These pipes are part of a water steam cycle (WSC) system. The steam turbine system may have a number of steam turbine segments configured to receive steam from the HRSG with each steam flow having different characteristics. For example, steam may be delivered in a number of steam flow pipes carrying high, intermediate and low pressure steam to a high pressure (HP), intermediate pressure (IP) and low pressure (LP) steam turbine segments, respectively. Each steam turbine segment may include its own admission valve(s) that controls flow of steam thereto. The CCPP may use one or more generators operatively coupled to the gas turbine and steam turbine systems to generate power. A heat sink is positioned downstream of the low pressure segment of the steam turbine system to condense the steam.

Piping for the various steam flows typically require very complex layouts in order to address a number of challenges. First, the piping layouts are arranged to handle appropriate thermal expansion during operation. In this regard, current piping layouts include a large horizontal bend, called a thermal expansion loop, in the pipe for each steam flow. The thermal expansion loop is typically positioned below an outlet of the HRSG to which the pipes are attached, and extends in a horizontal plane high above the floor of the CCPP. Each thermal expansion loop is supported a relatively large distance off the floor of the CCPP, e.g., 15-20 feet. Each loop also is relatively long, e.g., 100 feet, and consumes a large, horizontal area above the floor of the CCPP. After the thermal expansion loop, the piping includes a vertical drop segment that brings the piping close to the floor of the CCPP, e.g., 1-3 feet above it. Consequently, the piping enters the admission valves of the steam turbine segments from vertically below, which does not provide much flexibility in the piping layout because the floor is close by. Second, the piping layouts require routing from the HRSG to the respective steam turbine and other structure such as a de-superheater around other structure in the CCPP, e.g., other piping, support structures, parts of the gas or steam turbine systems and ancillary devices such as pumps, air inlets, etc. Each structure may be at different heights relative to a floor of the CCPP, further complicating the piping layout. Third, adequate structural support must be provided for the piping layouts, i.e., so the pipes are within stress limits. Structural support typically requires large, steel racks that are supported either on the floor of the CCPP or suspended from the roof. In either event, the structures are complex to build and increase the CCPP building size requirements. In view of the foregoing, piping layouts are typically very complex and expensive to build. In particular, the length of piping required can be very long.

BRIEF DESCRIPTION OF THE INVENTION

A first aspect of the disclosure provides a piping layout for a water steam cycle (WSC) system for a steam turbine (ST) system of a combined cycle power plant, the piping layout comprising: a first steam flow pipe delivering steam from a steam source to a high pressure (HP) segment of the ST system, and wherein the first steam flow pipe includes a first vertically oriented thermal expansion portion.

A second aspect of the disclosure provides a steam turbine (ST) system for a combined cycle power plant, the steam turbine system comprising: a high pressure (HP) segment and an intermediate pressure (IP) segment; a first steam flow pipe delivering steam from a steam source to the HP segment of the ST system; and a second steam flow pipe delivering steam from the steam source to the IP segment of the ST system, wherein at least one of the first and steam flow pipes includes a first vertically oriented thermal expansion portion.

A third aspect of the disclosure provides a combined cycle power plant (CCPP), comprising: a gas turbine (GT) system; a heat recovery steam generator (HRSG) for generating steam from exhaust of the GT system; a steam turbine (ST) system including a high pressure (HP) segment and an intermediate pressure (IP) segment, the ST system and the GT system operatively coupled to at least one generator for generating power; a water steam cycle (WSC) system operatively coupled to the HRSG and the ST system; and a piping layout for the WSC system, the piping layout including: a first steam flow pipe delivering steam from the HRSG to the HP segment of the ST system; and a second steam flow pipe delivering steam from the HRSG to the IP segment of the ST system, wherein at least one of the first and second steam flow pipes includes a first vertically oriented thermal expansion portion.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
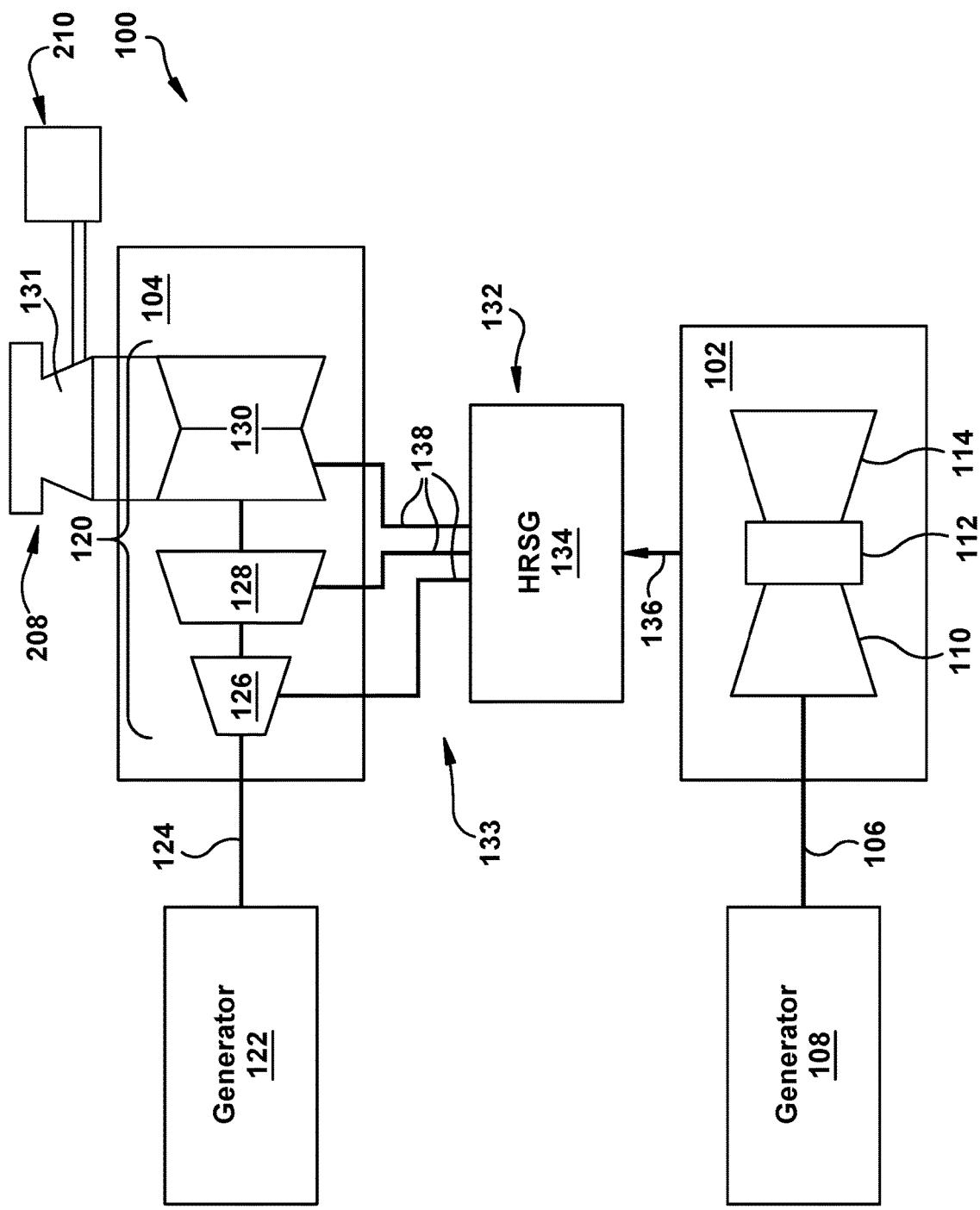
FIG. 1 shows a schematic diagram of a combined cycle power plant (CCPP) that may employ the teachings of the disclosure.

As an initial matter, in order to clearly describe the current disclosure it will become necessary to select certain terminology when referring to and describing relevant machine components within a water steam cycle (WSC) system, a steam turbine (ST) system and/or a combined cycle power plant. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the steam through a piping layout or, for example, the flow of air through the combustor or coolant through one of the turbine's component systems. The term "downstream" corresponds to the direction of flow of the fluid, and the term "upstream" refers to the direction opposite to the flow. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a piping layout for a water steam cycle (WSC) system, a steam turbine (ST) system, or combined cycle power plant. The piping layout removes the need for a large, horizontal thermal expansion loop by replacing it with one or more vertically oriented thermal expansion portions.

Turning to FIG. 1, a schematic view of portions of an illustrative combined cycle power plant (CCPP) 100 are shown. CCPP 100 is one example of a plant in which teachings of the disclosure may be employed. In the instant example, CCPP 100 is a multiple shaft system with two generators, but one with skill in the art will readily understand that the teachings of the disclosure are applicable to any variety of combined cycle power plant. CCPP 100 may include a gas turbine system 102 and a steam turbine system 104.

Gas turbine system 102 may be mechanically coupled by a shaft 106 to a first generator 108, which generates electrical energy. Gas turbine system 102 may include a compressor 110 and a combustor 112. Gas turbine system 102 also includes gas turbine 114 coupled to common compressor/turbine shaft 106. In one embodiment, gas turbine system 102 is a MS7001FB engine, sometimes referred to as a 9FB engine, commercially available from General Electric Company, Greenville, S.C. The present disclosure is not limited to any one particular gas turbine system and may be implanted in connection with other engines including, for example, the 7FA, 9FA, 7HA or 9HA engine models of General Electric Company. In operation, air enters the inlet of compressor 110, is compressed and then discharged to combustor 112 where fuel such as a gas, e.g., natural gas, or a fluid, e.g., oil, is burned to provide high energy combustion gases which drive gas turbine 114. In gas turbine 114, the energy of the hot gases is converted into work, some of which is used to drive compressor 110 through rotating shaft 106, with the remainder available for useful work to drive a load such as first generator 108 via shaft 106 for producing electricity.

Steam turbine system 104 includes a steam turbine 120 that is operably coupled to another generator 122 through shaft 124. Steam turbine system 104 may include one or more steam turbine segments, e.g., as shown, a high pressure (HP) segment 126, an intermediate pressure (IP) segment 128 and a low pressure (LP) segment 130. Each segment 126, 128, 130 includes a plurality of rotating blades (not shown) mechanically coupled to shaft 124, which rotate the shaft based on the steam flow thereover. A condenser 131 may be operably coupled to an appropriate ST segment, e.g., a last-in-line segment such as LP segment 130 (lateral condenser arrangement).

CCPP 100 may also include a steam source 132, which may be include a heat recovery steam generator (HRSG) 134 operably connected to gas turbine system 102 and steam turbine system 104. As understood, exhaust 136 from gas turbine system 102 is used by HRSG 134 to create steam flow(s) 138 for use by steam turbine system 104. HRSG 134 may include a conventional HRSG configuration, such as those used in conventional combined cycle power systems, and/or may be embodied as another type of heat exchanger or similar component for using exhaust energy to produce steam. For example, HRSG 134 may include a thermally conductive pipe, line, etc., with water therein such that water in HRSG 134 is heated by exhaust 136 (FIG. 1) to produce steam flow(s) 138. HRSG 134 may be fluidly connected to both gas turbine system 102 and steam turbine system 104 via conventional piping (numbering omitted), described further herein.

In operation, steam from steam source 132 (e.g., HRSG 134 and perhaps other sources) is directed through steam flow pipes of a water steam cycle (WSC) system 133, described in greater detail herein, and enter an inlet of HP segment 126, IP segment 128 and/or LP segment 130. Steam is channeled therein to impart a force on blades thereof causing shaft 124 to rotate. As understood, steam form an upstream turbine may be employed later in a downstream turbine. The steam thus produced by steam source 132 drives at least a part of steam turbine system 104 in which work is extracted to drive shaft 124 and an additional load such as second generator 122 which, in turn, produces additional electric power.

It is understood that generators 108, 122 and shafts 106, 124 may be of any size or type known in the art and may differ depending upon their application or the system to which they are connected. Common numbering of the generators and shafts is for clarity and does not necessarily suggest these generators or shafts are identical.

Figure 2:
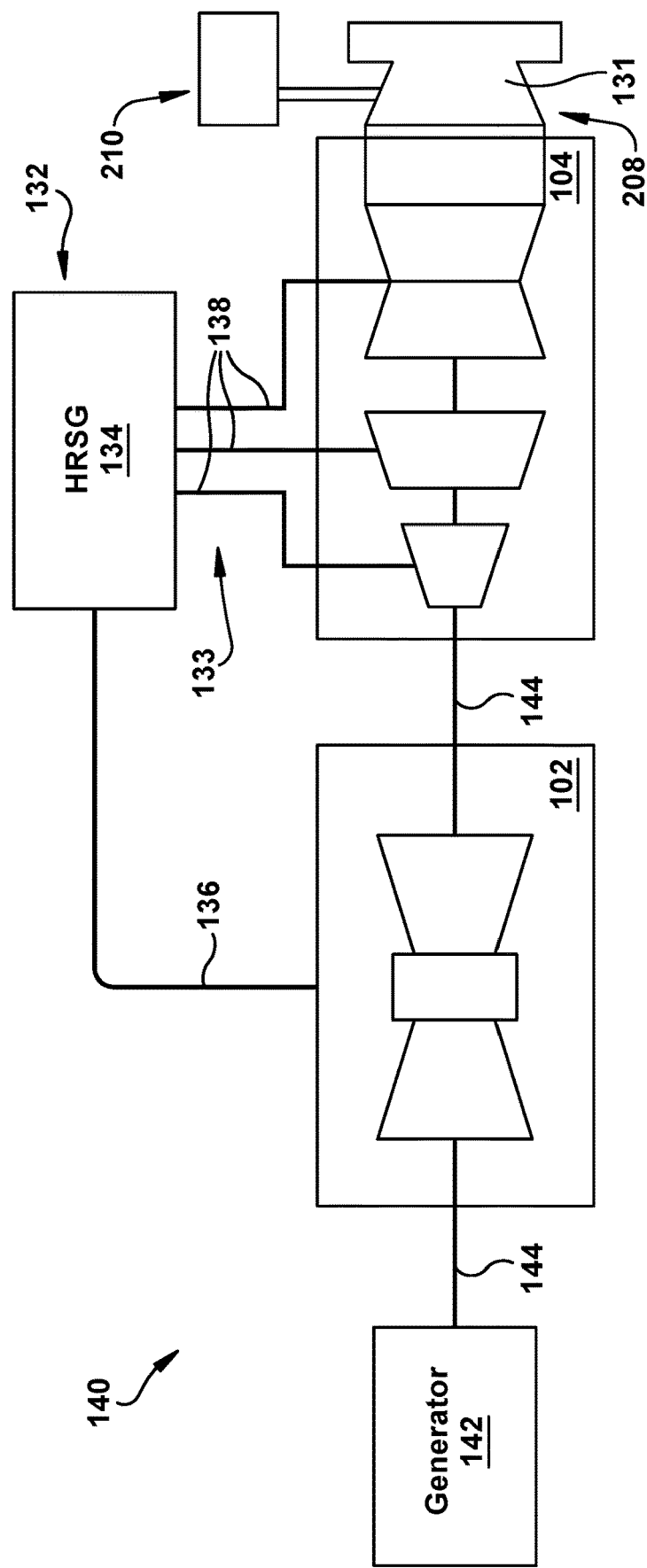
FIG. 2 shows a schematic diagram of another CCPP that may employ the teachings of the disclosure.

In another embodiment, shown in FIG. 2, a single shaft combined cycle power plant 140 may include a single generator 142 coupled to both gas turbine system 102 and steam turbine system 104 via a common shaft 144. Steam source 132, steam turbine system 104 and/or gas turbine system 102 may be similar to those described relative to FIG. 1. Here, also, condenser 131 may be operably coupled to an appropriate ST segment, e.g., a last-in-line segment such as LP segment 130 (axial condenser arrangement). However embodied, CCPP 100 (FIG. 1), 140 (FIG. 2) incorporating gas turbine system 102, steam source 132, and steam turbine system 104 can include or interact with any now known or later developed control system (not shown) to provide automated control thereof.

Figure 3:
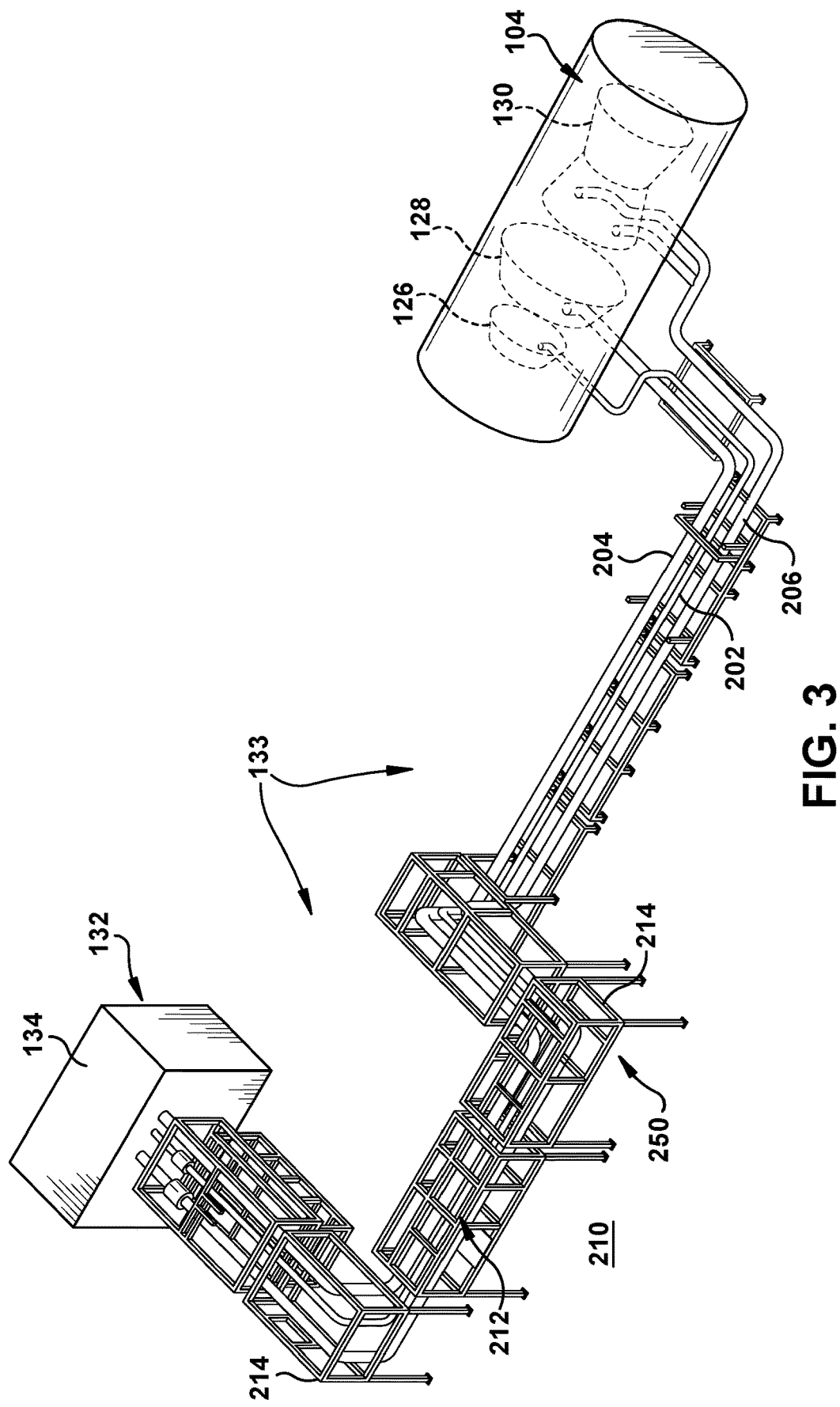
FIG. 3 shows a perspective view of a conventional piping layout for steam flow pipes in a CCPP.

As shown in FIGS. 1 and 2, steam flows 138 from steam source 132 (e.g., HRSG 134) are fed to steam turbine system 104 using WSC system 133. Each steam flow 138 (FIGS. 1 and 2) is provided in a respective steam flow pipe of WSC system 133. FIG. 3 shows a perspective view of a conventional piping layout 200 in which steam flow pipes 202, 204, 206 for, respectively, HP segment 126, IP segment 128 and LP segment 130, are shown. Steam flow pipes 202, 204, 206 are coupled to respective manifolds (not shown) in HRSG 134 that supply the appropriate pressure steam. Each pipe 202, 204, 206 exits from HRSG 134 at a point relatively high off of a floor 210 of the CCPP (gas turbine system not shown in FIG. 3), and is directed along a path toward ST segments 126, 128, 130. In order to allow thermal expansion of the steam, as illustrated, a large, horizontal thermal expansion portion 212 and a large variety of complex, tall structural supports 214 are provided in piping layout 200. The large, horizontal thermal expansion portion 212 allows for thermal expansion of the steam, preventing damage to, among other things, the pipes. Structural supports 214 provide support for the large horizontal layout. Once through the horizontal thermal expansion portion 212, pipes 202, 204, 206 run along a floor 210 of the CCPP. Pipes 202, 204, 206 enter their respective steam turbine segments 126, 128, 130 from below admission valves (not shown) thereof. While particular schematic examples of a CCPP have been provided in FIGS. 1-3, it is understood that various alternative arrangements exist including, for example, less ST segments 226, 228, 230.

Figure 4:
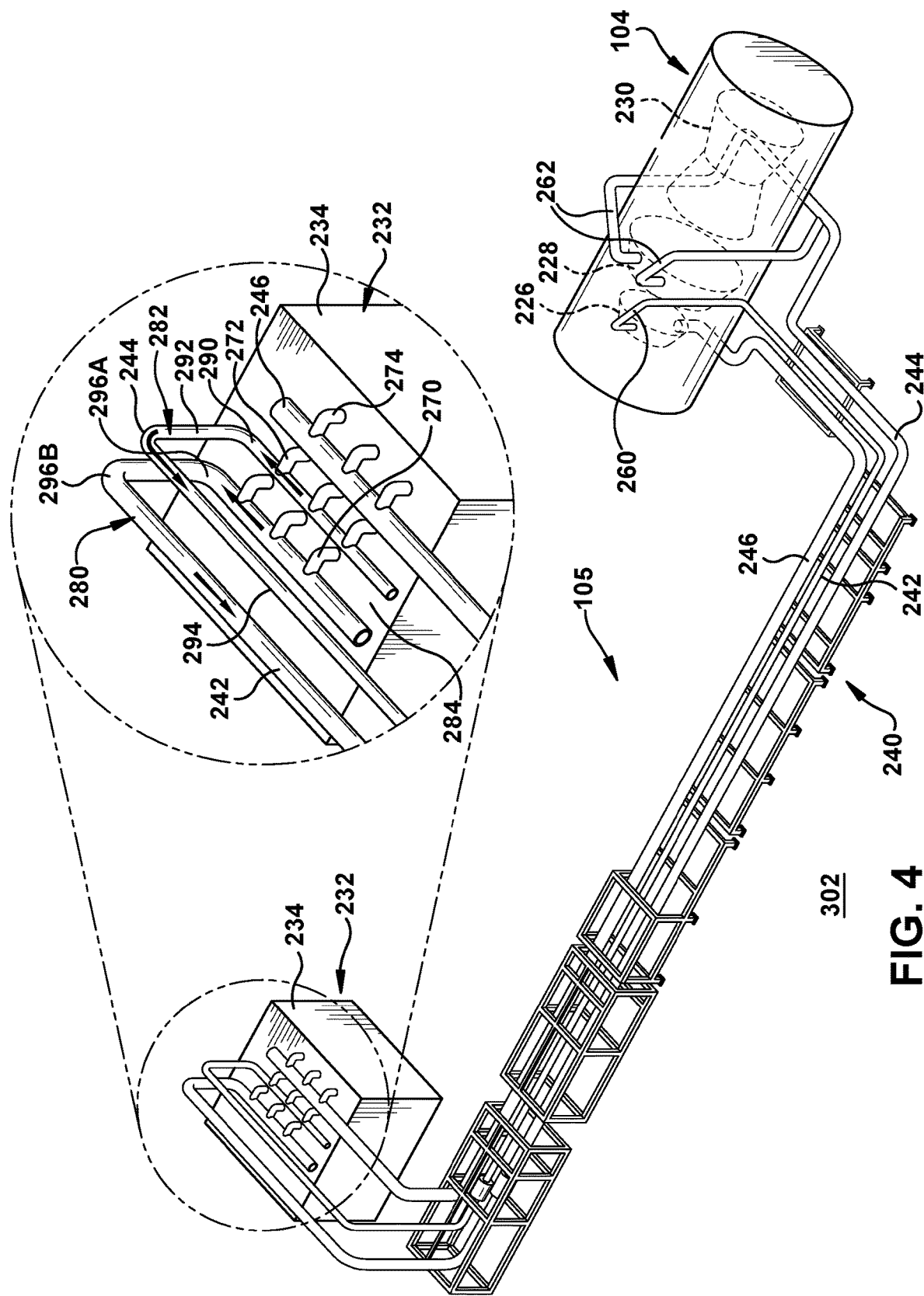
FIG. 4 shows a perspective view of a piping layout for steam flow pipes in a CCPP according to embodiments of the disclosure.
Figure 5:
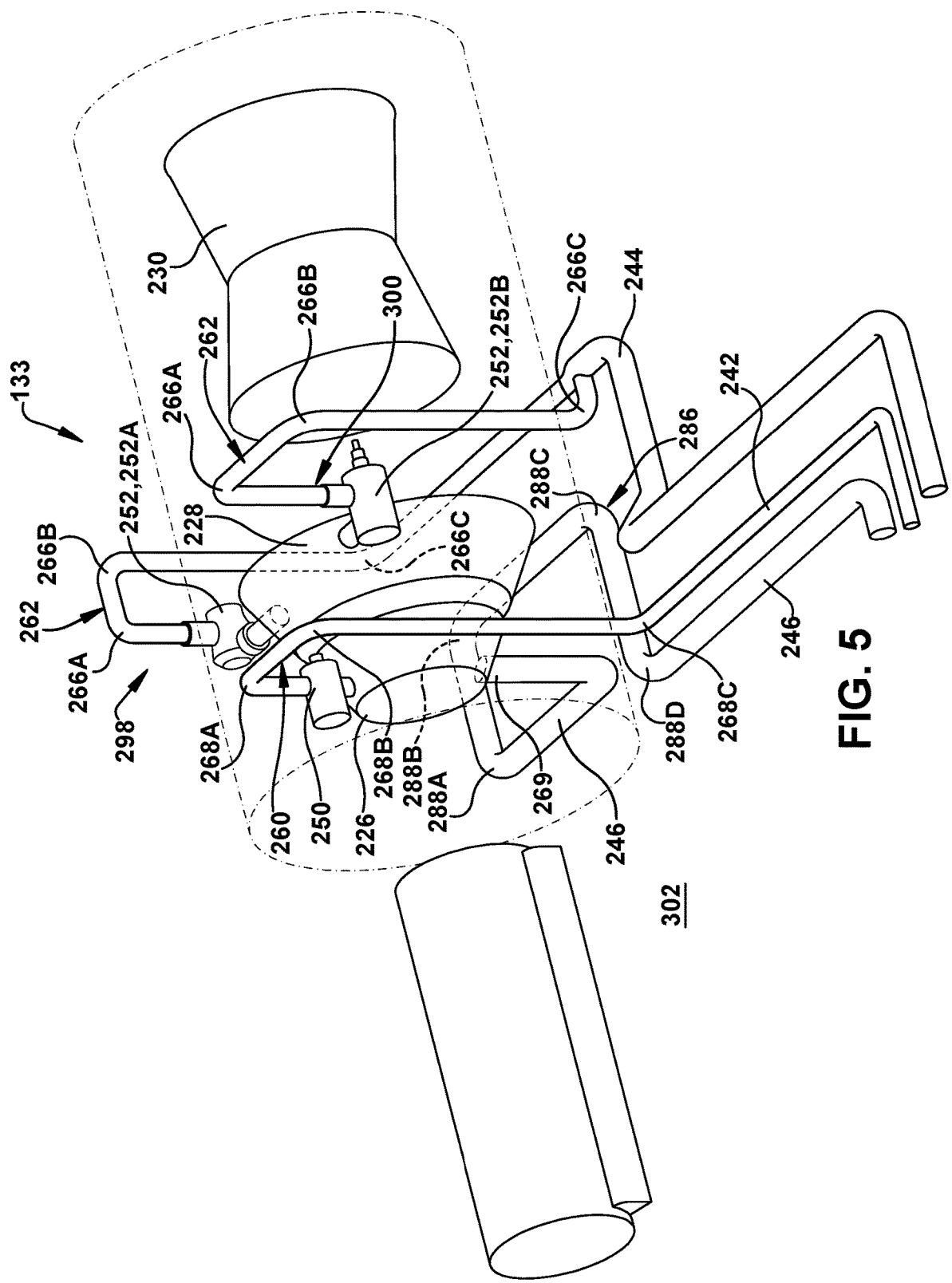
FIG. 5 shows a detailed perspective view of a piping layout for steam flow pipes in a CCPP according to embodiments of the disclosure.

FIGS. 4 and 5 show a perspective view and a partial perspective view of a piping layout 240 for a WSC system 133 for ST system 104 of a CCPP 105 according to embodiments of the disclosure. CCPP 105 may be identical to CCPP 100 (FIG. 1) or CCPP 140 (FIG. 2), except for piping layout 240. In FIGS. 4 and 5, a gas turbine system is not shown for clarity. However, a raising of a gas turbine system intake (not shown) provides additional vertical clearance from floor 302 for vertically oriented thermal expansion portion 260 and/or 262, as described herein. Piping layout 240 includes a first steam flow pipe 242 delivering steam from a steam source 132 to a high pressure (HP) segment 226 of ST system 104, and a second steam flow pipe 244 delivering steam from steam source 132 to an intermediate pressure (IP) segment 228 of ST system 104. In the example shown, a reheat steam pipe 246 may also deliver expanded steam from HP segment 226 of ST system 104 back to steam source 132 for reheating. As understood, reheat steam pipe 246 may not be necessary in all instances, see e.g., FIG. 7 where no IP segment 228 is provided. It is also understood that any of the various embodiments shown including reheat steam pipe 246 may have it omitted. As shown in FIG. 5, each of the HP and IP segments 226, 228 includes a respective admission valve 250, 252 that controls admission of steam thereto. (LP segment 230 includes one also, but not shown). In contrast to conventional piping layouts, piping layout 240 includes a vertically oriented thermal expansion portion 260 and/or 262 in at least one of first steam flow pipe 242 and second steam flow pipe 244. In FIG. 4 both steam flow pipes 242, 244 are shown with such portions. As used herein, a "thermal expansion portion" may include any length of steam flow pipe that extends in a manner to provide thermal expansion of steam therein. The portion can take any of a variety of forms such as but not limited to: a portion of pipe extending in a direction other than in a most direct path to an intended destination of the steam flowing therein, i.e., a positioning of the pipe in a fashion contrary to its most direct path to an intended destination; and/or additional turns than necessary to position the pipe in the intended direction of travel. The portions are "vertically oriented" because they extend at greater than a 45° angle relative to horizontal (in contrast to horizontal thermal expansion portion 212 in FIG. 3). In the example, shown best in FIG. 5, first vertically oriented thermal expansion portion 260, 262 includes length of pipe that extends vertically farther than necessary to direct steam into a respective admission valve 250, 252. Further, although not necessary, each first vertically oriented thermal expansion portion 260, 262 may include at least three sharp angle turns, e.g., 266A-C on portion 262 and 268A-C on portion 260, immediately upstream of the admission valve 252 of the respective segment. However, it is understood that thermal expansion portions 260, 262 may take any path, e.g., curved, looped, etc., necessary to provide thermal expansion. First and second steam flow pipes 242, 244 enter admission valves 250, 252 of respective HP and IP segments 226, 228 from vertically above the admission valves.

As shown in FIG. 4, each of first and second steam flow pipes 242, 244 fluidly couple to receive steam from steam source 232, e.g., an HRSG 234, at a respective outlet 270, 272, 274. In contrast to conventional piping layouts, first and second steam flow pipes 242, 244 may include a second vertically oriented thermal expansion portion 280, 282 in at least one of first and second steam flow pipes 242, 244. Second vertically oriented thermal expansion portion may include any length of steam flow pipe that extends in a manner to provide thermal expansion of steam therein. Again, the portion can take any of a variety of forms such as but not limited to: a portion of pipe extending in a direction other than in a most direct path to an intended destination of the steam flowing therein, i.e., a positioning of the pipe in a fashion contrary to its most direct path to an intended destination; and/or additional turns than necessary to position the pipe in the intended direction of travel. The portions 280, 282 are "vertically oriented" because they extend at greater than a 45° angle relative to horizontal (in contrast to horizontal thermal expansion portion 212 in FIG. 3), e.g., a horizontal top surface 284 of HRSG 134. Each vertically oriented thermal expansion portion 280, 282 is positioned immediately downstream from a respective outlet 270, 272 (272 also an inlet) of HRSG 134. In the example of FIG. 4, each second vertically oriented thermal expansion portion 280, 282 (labeled for only 282 for clarity) includes a first length of pipe 290 that extends away from a most direct path to ST segments 226, 228, a second length of pipe 292 extending vertically therefrom, and a third length of pipe 294 that extends vertically above (aligned or offset) from first length of pipe 290 in a most direct path to ST segments 226, 228. Collectively, lengths of pipe 290, 292, 294 provide a thermal expansion portion 280, 282. Further, although not necessary, each second vertically oriented thermal expansion portion 280, 282 may include at least two sharp angle turns, e.g., 296A-B shown in portion 280, immediately downstream from a respective outlet 270, 272 of the HRSG. However, it is understood that thermal expansion portions 280, 282 may take any path, e.g., curved, looped, etc., necessary to provide thermal expansion. First and second steam flow pipes 242, 244 are devoid of any thermal expansion portions between first and second vertically oriented thermal expansion portions 260, 262 and 280, 282. In this fashion, thermal expansion portions 260, 262, 280, 282 replace a large horizontal thermal expansion loop (e.g., 212 in FIG. 3).

Where provided, third steam flow pipe 246 may couple to a reheat outlet of HP segment 226 to deliver expanded steam to steam source 132 for reheating the expanded steam therefrom. Third steam flow pipe 246 may follow a similar path as first and/or second steam flow pipes 242, 244. In one embodiment, third steam flow pipe 246 starts vertically below HP segment 226, e.g., because of the space freed by having first and second steam flow pipes 242, 244 enter ST system 104 from above. Third steam flow pipe 246 may include a horizontally oriented thermal expansion portion 286, as shown in FIG. 5. Horizontally oriented thermal expansion portion 286 may include at least three sharp angle turns 288A-D immediately downstream of an outlet 269 of HP segment 226.

Figure 6:
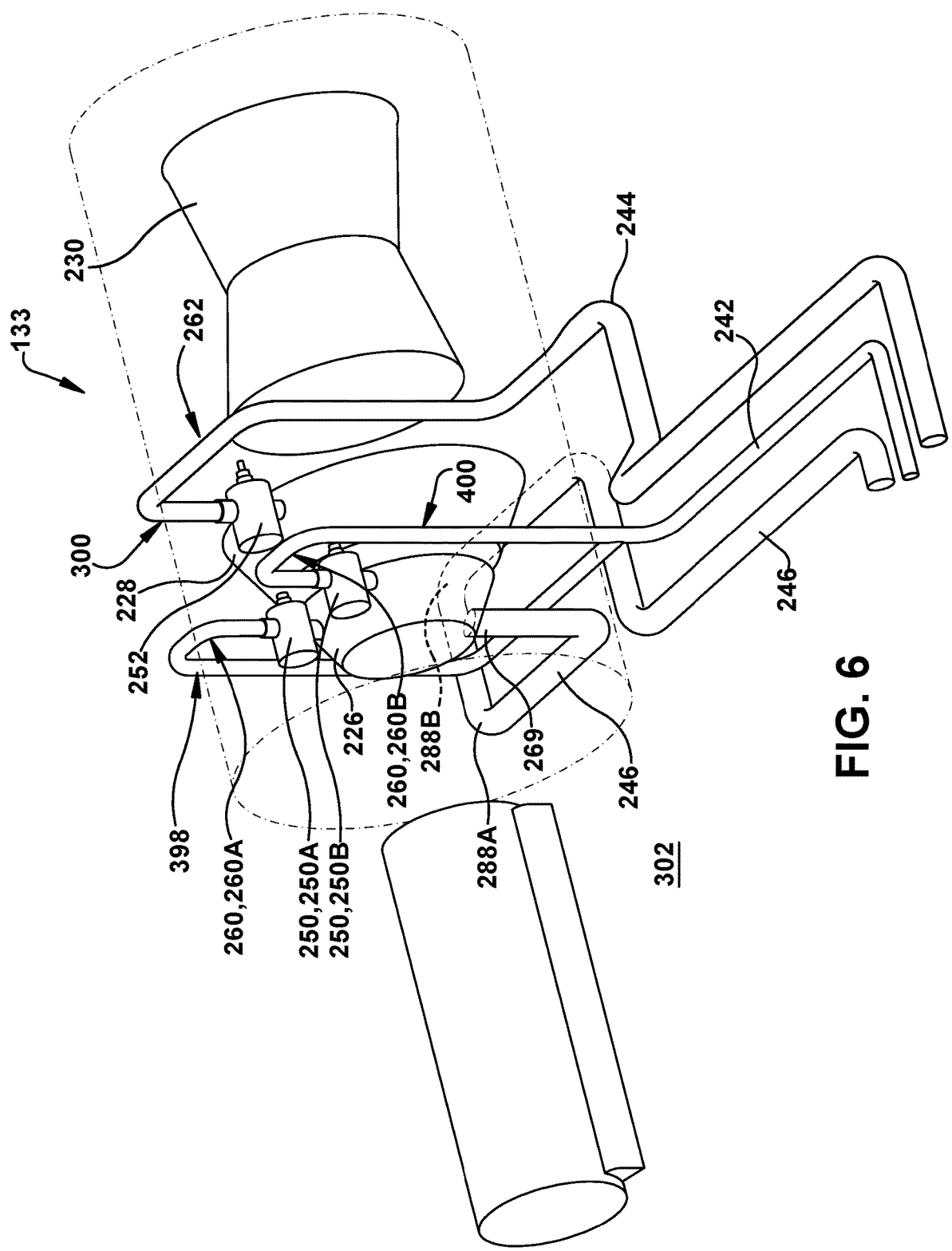
FIG. 6 shows a detailed perspective view of a piping layout for steam flow pipes in a CCPP according to another embodiment of the disclosure.

As shown in FIG. 5, one or more steam flow pipes, e.g., second steam flow pipe 244, may include a first portion 298 entering a first admission valve 252A of IP segment 228 and a second portion 300 entering a second admission valve 252B of IP segment 228. That is, second steam flow pipe 244 splits prior to entry to IP segment 228. Each of the first and second portions 298, 300 includes a respective first vertically oriented thermal expansion portion 262 immediately upstream of the respective admission valve of the respective portion. Here, first steam flow pipe 242 includes only one portion and one admission valve 250. FIG. 6 shows another embodiment in which a vertically oriented thermal expansion portion 260 includes first steam flow pipe 242 with a first portion 398 entering a first admission valve 250A of HP segment 228 and a second portion 400 entering a second admission valve 250B of HP segment 226. That is, steam flow pipe 242 splits prior to entry to HP segment 226. Each of the first and second portions 398, 400 includes a respective first vertically oriented thermal expansion portion 260 immediately upstream of the respective admission valve. Here, second steam flow pipe 244 includes only one portion and one admission valve 252 to LP segment 230. It is emphasized that one or more steam flow pipes, e.g., 242 and/or 244, may include any number of vertically oriented thermal expansion portions 262, as desired.

Figure 7:
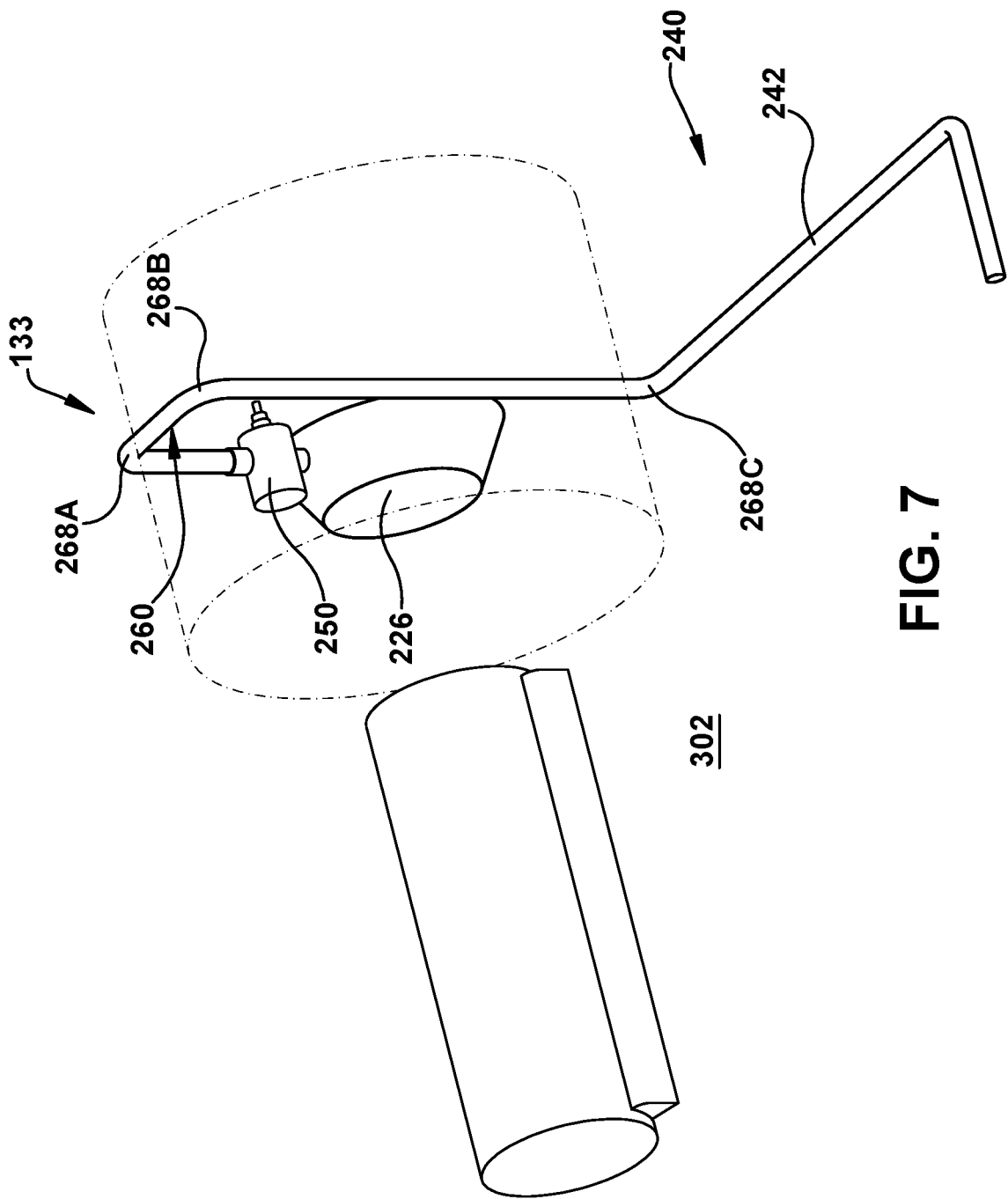
FIG. 7 shows a detailed perspective view of a piping layout for steam flow pipes in a CCPP according to yet another embodiment of the disclosure.

The teachings of the disclosure are also applicable to WSC systems 133 that supplies only one steam turbine segment. That is, while two vertically oriented thermal expansion portions 260, 262, i.e., one to each of HP segment 226 and IP segment 228, are shown in FIGS. 4-6, it is understood that where only one steam turbine segment is provided, only one set (i.e., of one or more) vertically oriented thermal expansion portions 260, 262 may be employed. FIG. 7 shows an example in which only an HP segment 226 is provided. Here, piping layout 240 for WSC system 133 may include first steam flow pipe 242 (only) delivering steam from steam source 132 (FIG. 4) to HP segment 226 of the ST system. Here, only steam flow pipe 242 includes a vertically oriented thermal expansion portion 260. It is understood that single steam flow pipe 242 may split, as shown in FIG. 6, with each portion including a vertically oriented thermal expansion portion 260.

Figure 8:
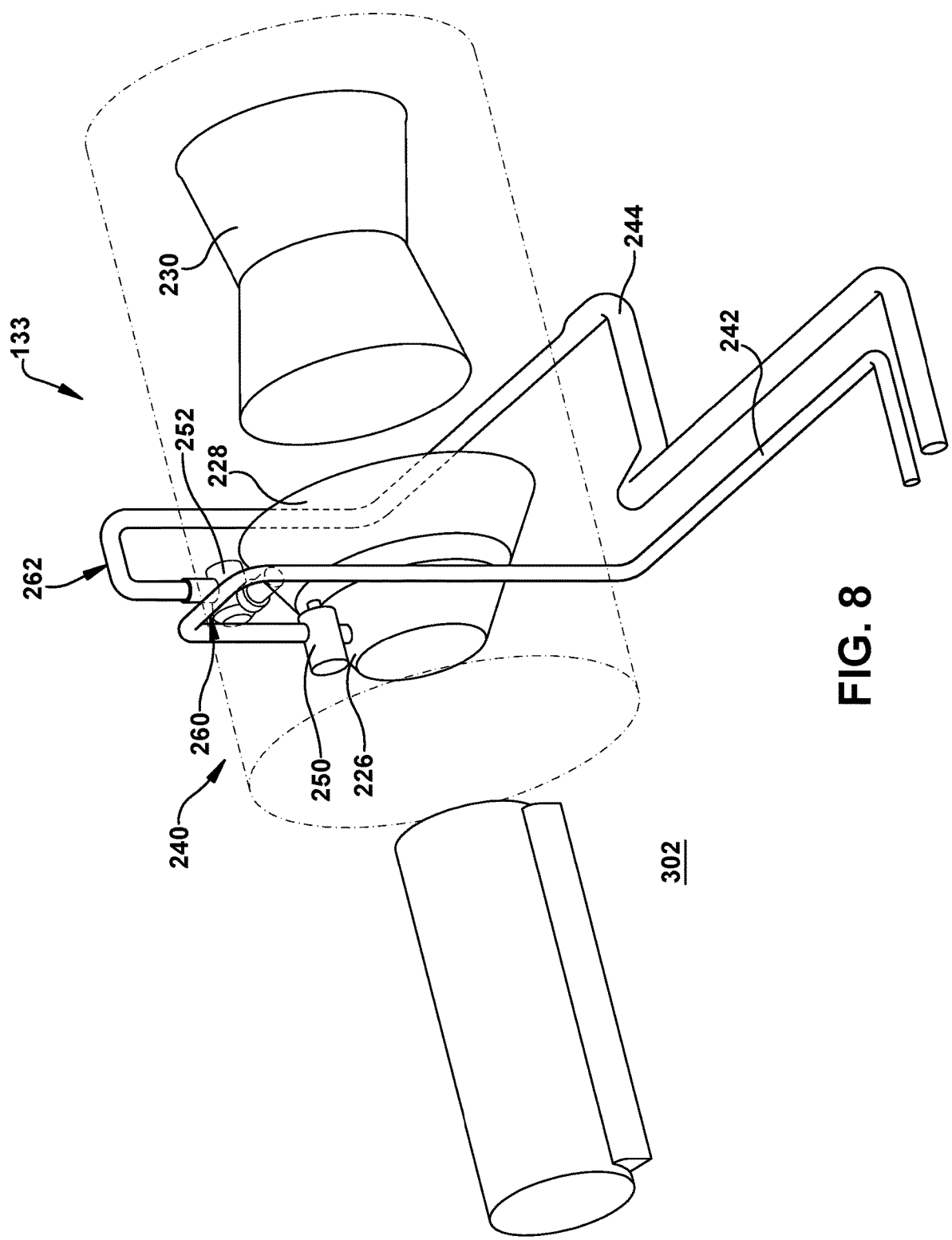
FIG. 8 shows a detailed perspective view of a piping layout for steam flow pipes in a CCPP according to an additional embodiment of the disclosure.
Figure 9:
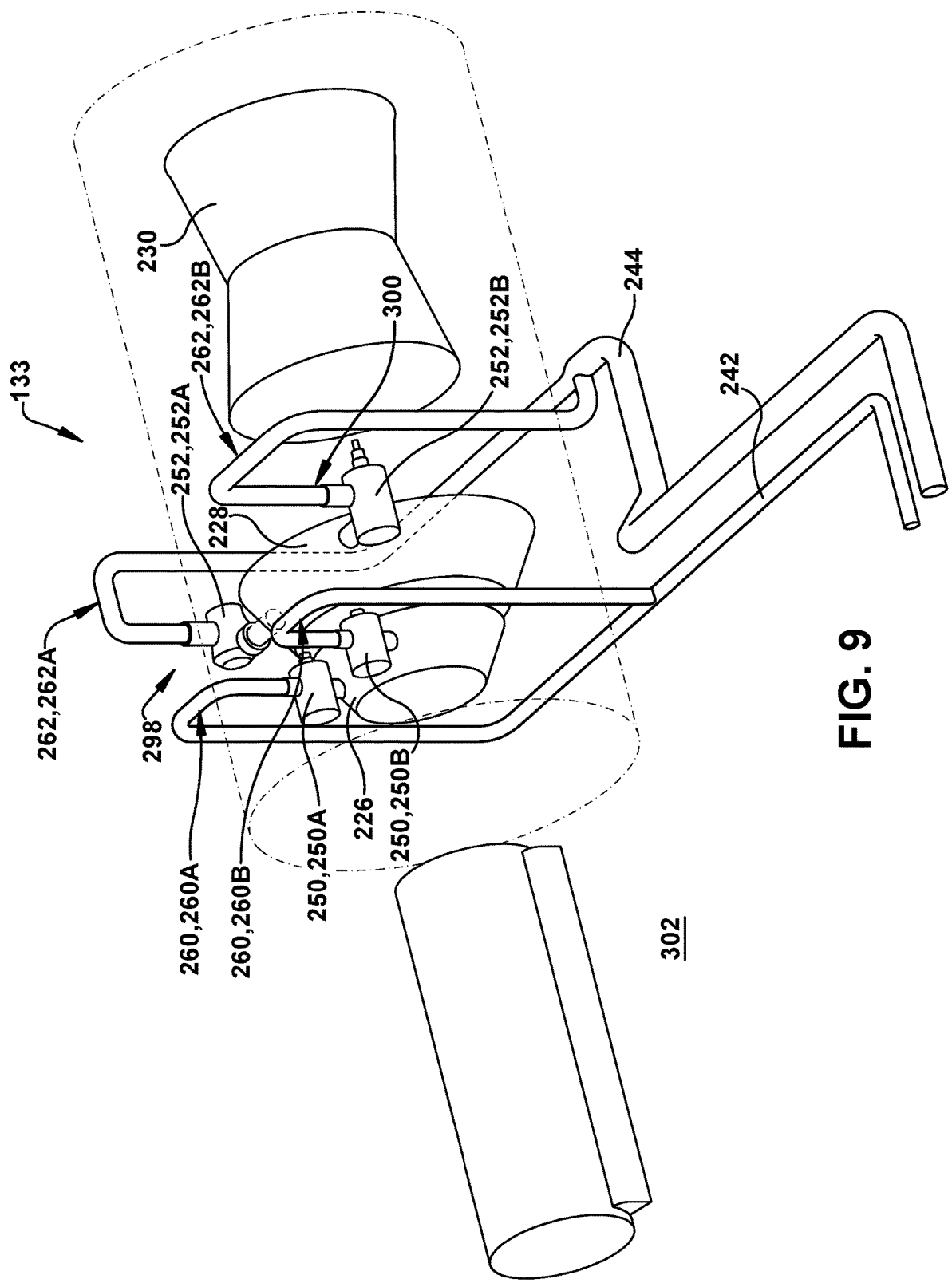
FIG. 9 shows a detailed perspective view of a piping layout for steam flow pipes in a CCPP according to another embodiment of the disclosure.
Figure 10:
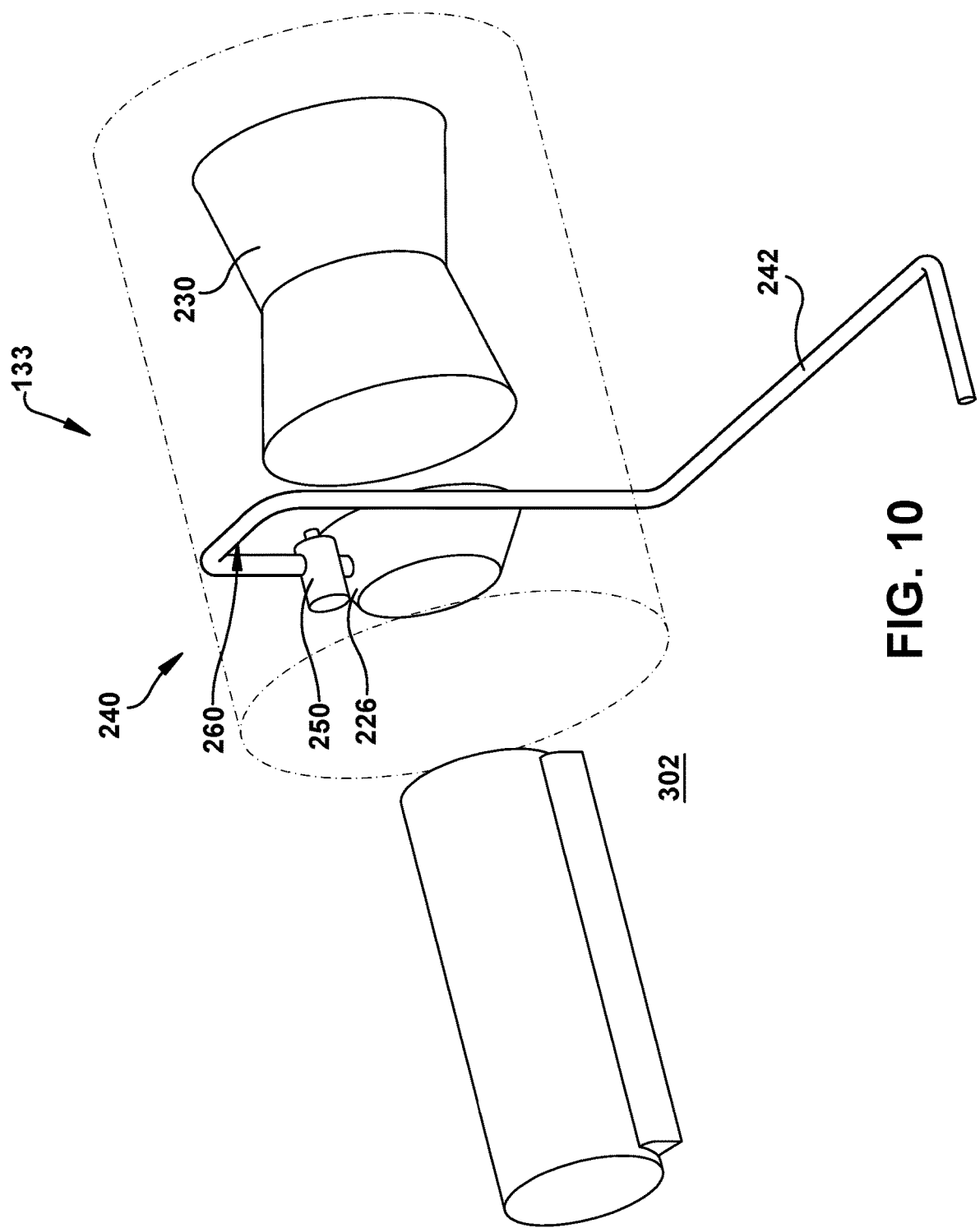
FIG. 10 shows a detailed perspective view of a piping layout for steam flow pipes in a CCPP according to yet another embodiment of the disclosure.
Figure 11:
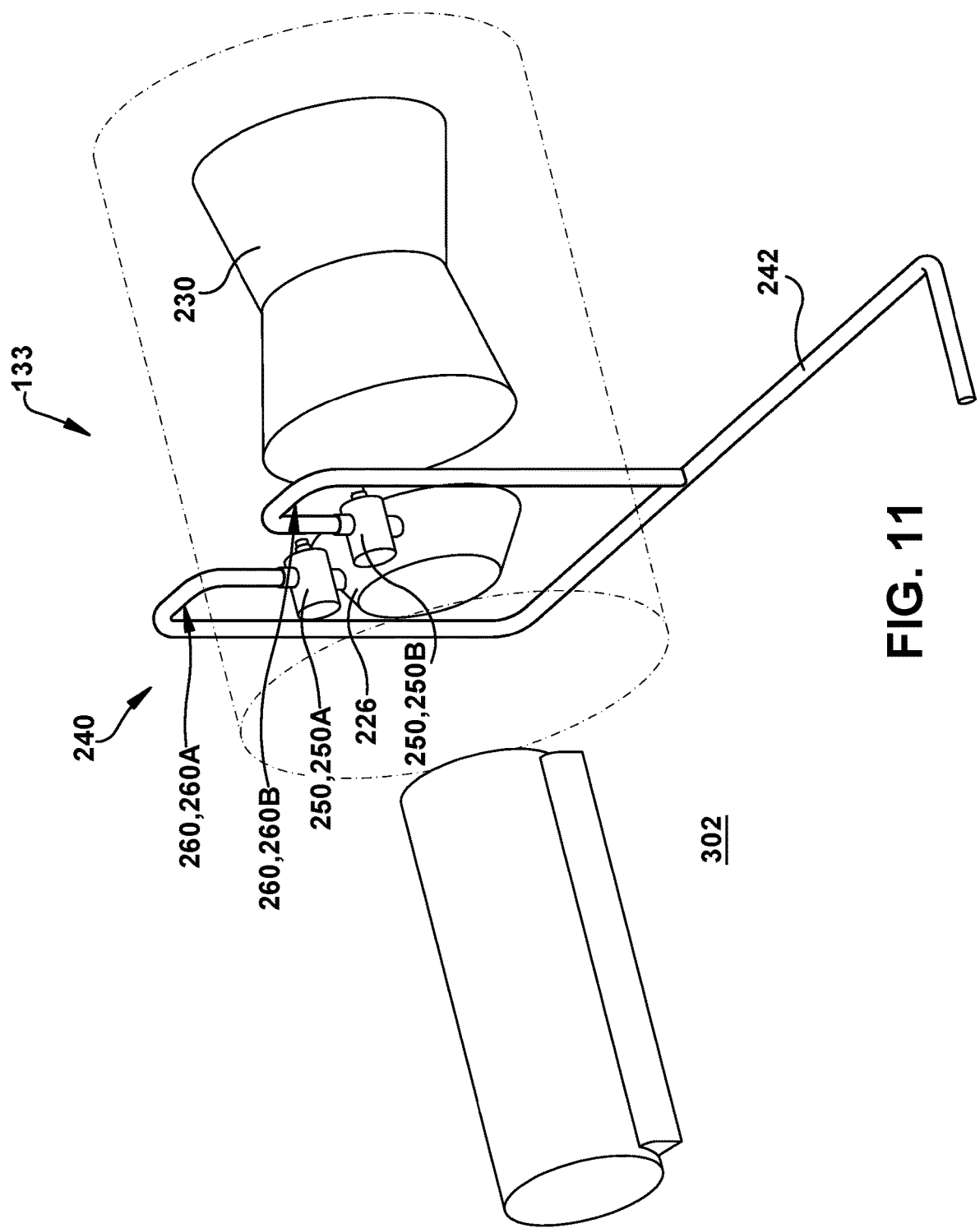
FIG. 11 shows a detailed perspective view of a piping layout for steam flow pipes in a CCPP according to a further embodiment of the disclosure.

FIGS. 8-14 show detailed perspective views of a piping layout for steam flow pipes in a CCPP according to other embodiments of the disclosure. FIG. 8 shows an embodiment in which HP segment 226 and IP segment 228 each have a single steam flow pipe 242, 244 coupled to respective admission valves 250, 252, with each having a vertically oriented thermal expansion portion 260, 262 therein. FIG. 9 shows an embodiment in which HP segment 226 and IP segment 228 each have a respective split steam flow pipe 242 and 244 coupled to admission valves 250A, 250B and 252A, 252B, with each split having a vertically oriented thermal expansion portion 260A, 260B and 262A, 262B, respectively. FIGS. 10 and 11 show embodiments in which HP segment 226 and LP segment 230 are present. In FIG. 10, piping layout 240 for WSC system 133 may include first steam flow pipe 242 (only) delivering steam from steam source 132 (FIG. 4) to HP segment 226 of the ST system. Here, only steam flow pipe 242 includes a vertically oriented thermal expansion portion 260. FIG. 11 shows a similar embodiment in which HP segment 226 only has a split steam flow pipe 242 coupled thereto, each split including a vertically oriented thermal expansion portion 260A, 260B.

Figure 12:
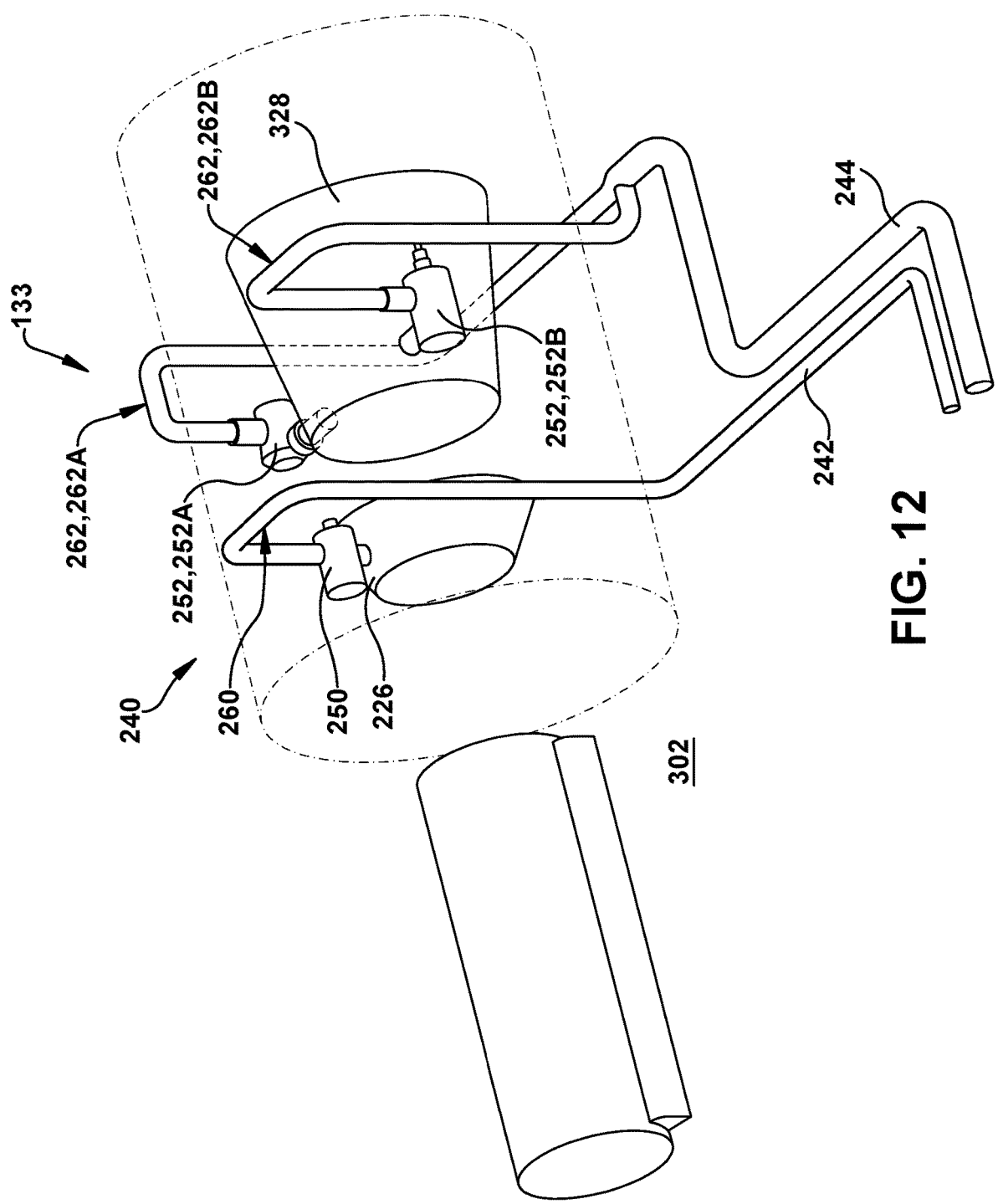
FIG. 12 shows a detailed perspective view of a piping layout for steam flow pipes in a CCPP according to an additional embodiment of the disclosure.
Figure 13:
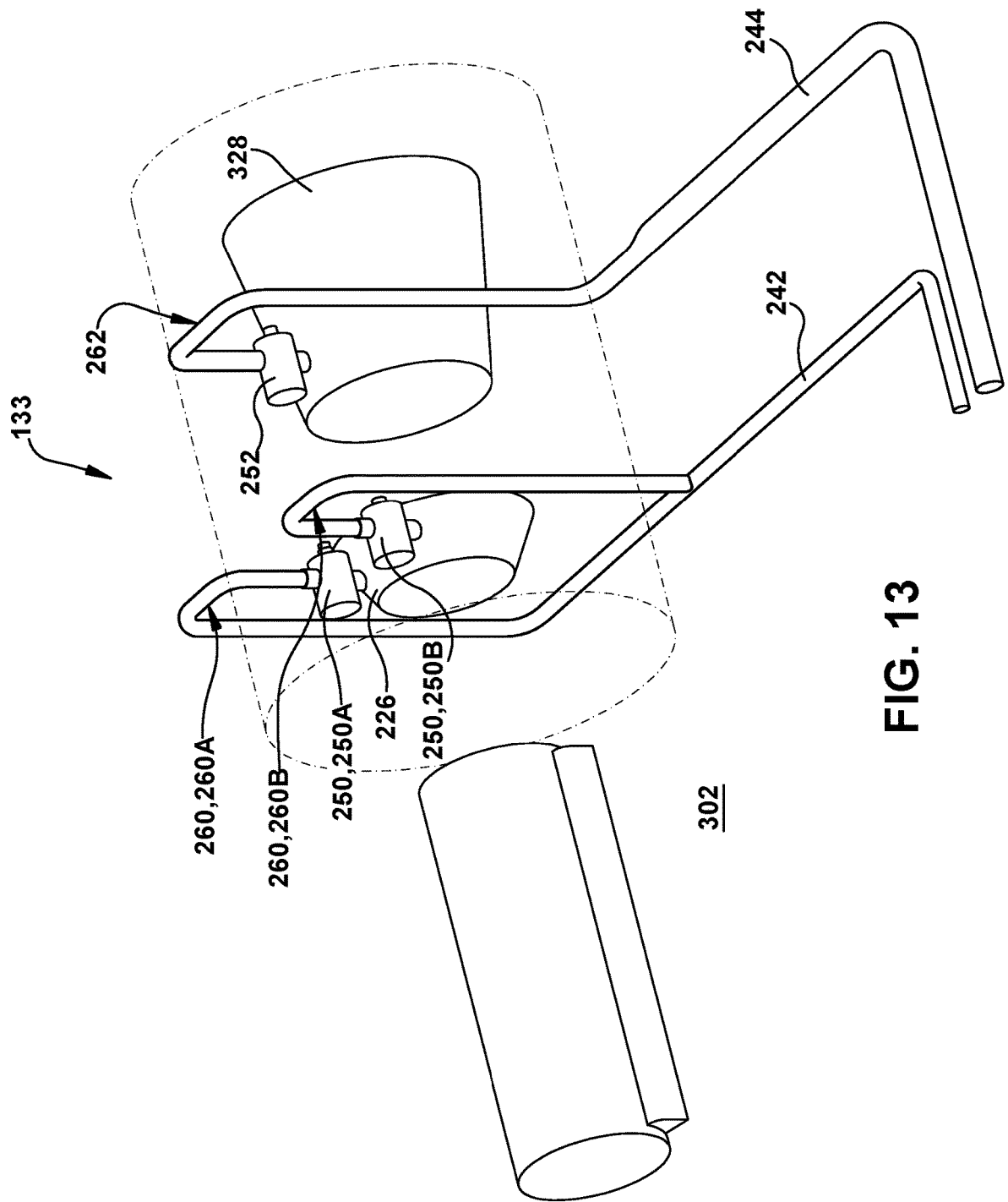
FIG. 13 shows a detailed perspective view of a piping layout for steam flow pipes in a CCPP according to another embodiment of the disclosure.
Figure 14:
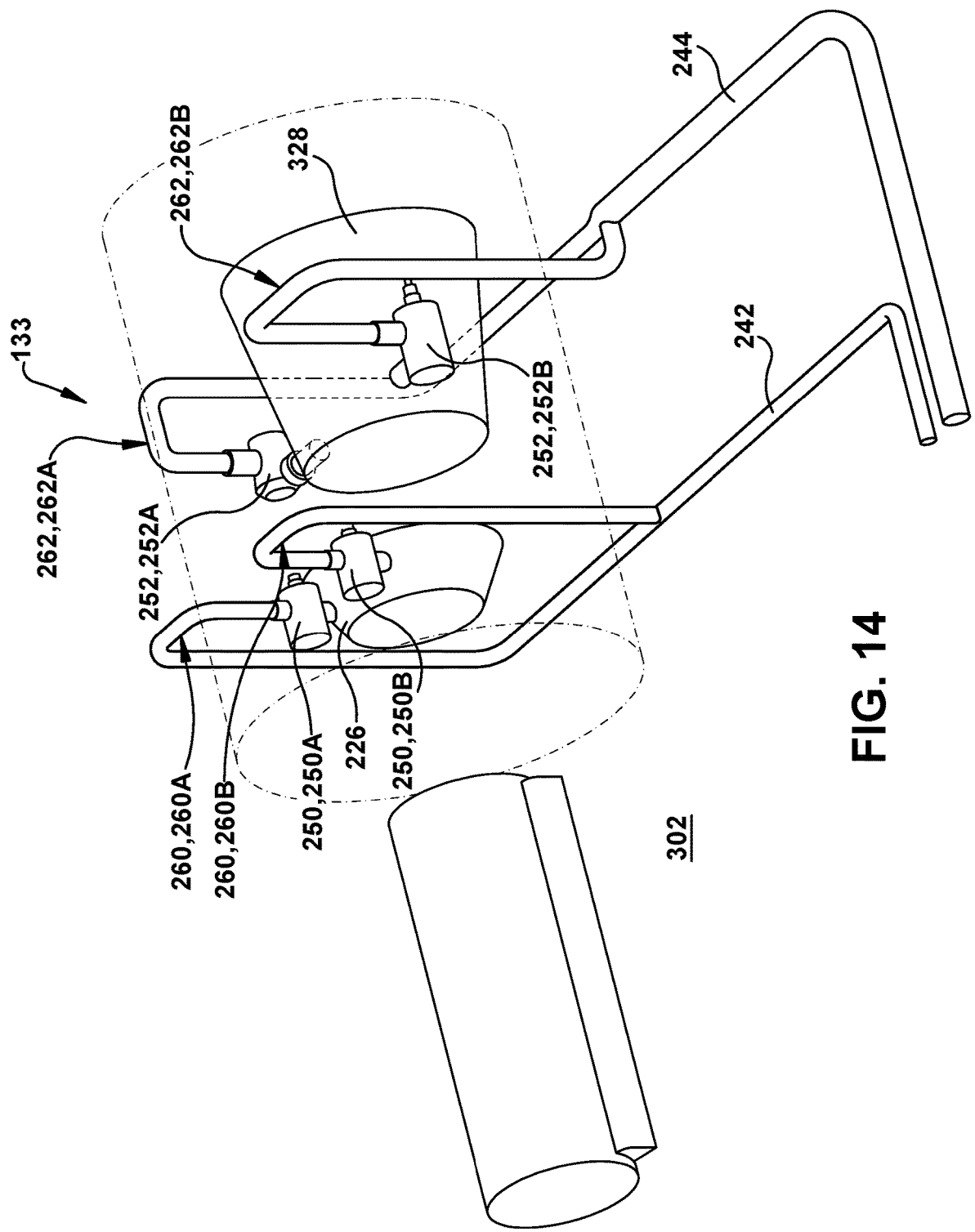
FIG. 14 shows a detailed perspective view of a piping layout for steam flow pipes in a CCPP according to yet another embodiment of the disclosure.

FIGS. 12-14 show embodiments in which HP segment 226 and a combination IP-LP segment 328 are present. FIG. 12 shows an embodiment in which HP segment 226 has a single steam flow pipe 242 coupled to admission valve 250 with vertically oriented thermal expansion portion 260, and combination IP-LP segment 328 has a split steam flow pipe 244 coupled to admission valves 252A, 252B, with each having a vertically oriented thermal expansion portion 262A, 262B. FIG. 13 shows an embodiment in which HP segment 226 has a split steam flow pipe 242 coupled to admission valves 250A, 250B, with each including vertically oriented thermal expansion portion 260A, 260B, and combination IP-LP segment 328 having a single steam flow pipe 244 coupled to admission valve 252 with a vertically oriented thermal expansion portion 262. FIG. 14 shows an embodiment in which HP segment 226 and combination IP-LP segment 328 each have a respective split steam flow pipe 242 and 244 coupled to admission valves 250A, 250B and 252A, 252B, with each split having a vertically oriented thermal expansion portion 260A, 260B and 262A, 262B, respectively. While particular piping layout 240 embodiments have been described herein, it is understood that other arrangements may be possible within the scope of the disclosure.

Embodiments of the disclosure may include a WSC system 133 including piping layout 240, a steam turbine system 104 including piping layout 240, or a CCPP 100 (FIG. 1), or 140 (FIG. 2) including piping layout 240.

As shown best in FIG. 4, piping layout 240 including vertically oriented thermal expansion portion(s) takes up less horizontal area, and requires less piping. Hence, piping layout 240 is easier to construct with less supports and less welding. Further, piping layout 240 reduces the amount of support structures necessary, and is more self-supporting—steam flow pipes 242, 244, 246 may now be positioned on floor 302 of the CCPP, but still have necessary thermal expansion portions. Further, piping layout 240 provides more flexibility because it eliminates the requirement for so much space. Piping layout 240 also provides flexibility in lowering forces and moments on ST system 104 nozzles. Further, piping layout 240 provides a more efficient foundation because it frees space below ST system 104, i.e., there is more space is available for other structure. Although shown with both, it is readily recognized that piping layout 240 may include first and/or second vertically oriented thermal expansion portions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A piping layout for a water steam cycle (WSC) system for a steam turbine (ST) system of a combined cycle power plant, the piping layout comprising:
   a first steam flow pipe delivering steam from a steam source to a high pressure (HP) segment of the ST system; and
   wherein the first steam flow pipe includes a first vertically oriented thermal expansion portion entering a first admission valve of the HP segment, the first vertically oriented thermal expansion portion includes at least a first plurality of three sharp angle turns connecting a first horizontal portion of the first vertically oriented thermal expansion portion to a first vertical portion of the first vertically oriented thermal expansion portion to a second horizontal portion of the first vertically oriented thermal expansion portion and then to a second vertical portion of the first vertically oriented thermal expansion portion immediately upstream of the first admission valve;
   the piping layout further comprising a second steam flow pipe delivering the steam from the steam source to an intermediate pressure (IP) segment of the ST system, wherein the second steam flow pipe a second vertically oriented thermal expansion portion entering a second admission valve of the IP segment and a third vertically oriented thermal expansion portion entering a third admission valve of the IP segment,
   wherein the second vertically oriented thermal expansion portion includes at least a second plurality of three sharp angle turns connecting a third horizontal portion of the second vertically oriented thermal expansion portion to a third vertical portion of the second vertically oriented thermal expansion portion to a fourth horizontal portion of the second vertically oriented thermal expansion portion and then to a fourth vertical portion of the second vertically oriented thermal expansion portion immediately upstream of the second admission valve;
   wherein the third vertically oriented thermal expansion portion includes at least a third plurality of three sharp angle turns connecting a fifth horizontal portion of the third vertically oriented thermal expansion portion to a fifth vertical portion of the third vertically oriented thermal expansion portion to a sixth horizontal portion of the third vertically oriented thermal expansion portion and then to a sixth vertical portion of the third vertically oriented thermal expansion portion immediately upstream of the third admission valve; and wherein the second, fourth, and sixth vertical portions enter the first, second, and third admission valves, respectively, from vertically above.

2. The piping layout of claim 1, wherein the first horizontal portion of the first vertically oriented thermal expansion portion is positioned below the HP segment of the ST system and transitions to the first vertical portion of the first vertically oriented thermal expansion portion and then transitions to the second horizontal portion of the first vertically oriented thermal expansion portion which is above the HP segment of the ST system.

3. The piping layout of claim 1, wherein the third and fifth horizontal portions of the second and third vertically oriented thermal expansion portions, respectively, are positioned below the IP segment of the ST system to and transition to the third and fifth vertical portions of the second and third vertically oriented thermal expansion portions, respectively, and then transition to the fourth and sixth horizontal portions of the second and third vertically oriented thermal expansion portions, respectively which are above the IP segment of the ST system.

4. The piping layout of claim 1 wherein the steam source includes a heat recovery steam generator (HRSG), each of the first and second steam flow pipes fluidly coupled to receive the steam from the HRSG at a respective outlet; and wherein at least one of the first and second steam flow pipes includes a fourth vertically oriented thermal expansion portion, the fourth vertically oriented thermal expansion portion is positioned immediately downstream from the respective outlet of the HRSG.

5. The piping layout of claim 4, wherein the at least one of the first and second steam flow pipes are devoid of any thermal expansion portions between the first, second, or third vertically oriented thermal expansion portions and the fourth vertically oriented thermal expansion portions.

6. The piping layout of claim 1, further comprising a third steam flow pipe delivering the steam from the HP segment of the ST system to the steam source, wherein the third steam flow pipe starts vertically below the HP segment.

7. The piping layout of claim 1, wherein the first vertically oriented thermal expansion portion includes a length of the first steam flow pipe extending in a direction other than in a most direct path to an intended destination of the steam flowing therein.

8. The piping layout of claim 1, wherein the first steam flow pipe further includes a fourth vertically oriented thermal expansion portion entering a fourth admission valve of the HP segment, the fourth vertically oriented thermal expansion portion includes at least a fourth plurality of three sharp angle turns connecting a seventh horizontal portion of the fourth vertically oriented thermal expansion portion to a seventh vertical portion of the fourth vertically oriented thermal expansion portion to an eighth horizontal portion of the fourth vertically oriented thermal expansion portion and then to an eighth vertical portion of the third vertically oriented thermal expansion portion immediately upstream of the fourth admission valve.

9. A steam turbine (ST) system for a combined cycle power plant, the ST system comprising:

a high pressure (HP) segment and an intermediate pressure (IP) segment;

a first steam flow pipe delivering steam from a steam source to the HP segment of the ST system; and a second steam flow pipe delivering the steam from the steam source to the IP segment of the ST system, wherein the first steam flow pipe includes a first vertically oriented thermal expansion portion entering a first admission valve of the HP segment, the first vertically oriented thermal expansion portion includes at least a first plurality of three sharp angle turns connecting a first horizontal portion of the first vertically oriented thermal expansion portion to a first vertical portion of the first vertically oriented thermal expansion portion to a second horizontal portion of the first vertically oriented thermal expansion portion and then to a second vertical portion of the first vertically oriented thermal expansion portion immediately upstream of the first admission valve;

wherein the second steam flow pipe includes a second vertically oriented thermal expansion portion entering a second admission valve of the IP segment and a third vertically oriented thermal expansion portion entering a third admission valve of the IP segment, wherein the second vertically oriented thermal expansion portion includes at least a second plurality of three sharp angle turns connecting a third horizontal portion of the second vertically oriented thermal expansion portion to a third vertical portion of the second vertically oriented thermal expansion portion to a fourth horizontal portion of the second vertically oriented thermal expansion portion and then to a fourth vertical portion of the second vertically oriented thermal expansion portion immediately upstream of the second admission valve;

wherein the third vertically oriented thermal expansion portion includes at least a third plurality of three sharp angle turns connecting a fifth horizontal portion of the third vertically oriented thermal expansion portion to a fifth vertical portion of the third vertically oriented thermal expansion portion to a sixth horizontal portion of the third vertically oriented thermal expansion portion and then to a sixth vertical portion of the third vertically oriented thermal expansion portion immediately upstream of the third admission valve; and wherein the second, fourth, and sixth vertical portions enter the first, second, and third admission valves, respectively, from vertically above.

10. The ST system of claim 9, wherein the steam source includes a heat recovery steam generator (HRSG), each of the first and second steam flow pipes fluidly coupled to receive the steam from the HRSG at a respective outlet; and wherein at least one of the first and second steam flow pipes includes a fourth vertically oriented thermal expansion portion immediately downstream from the respective outlet of the HRSG.

11. A combined cycle power plant (CCPP), comprising:

a gas turbine (GT) system:

a heat recovery steam generator (HRSG) for generating steam from exhaust of the GT system;

a steam turbine (ST) system including a high pressure (HP) segment and an intermediate pressure (IP) segment, the ST system and the GT system operatively coupled to at least one generator for generating power;

a water steam cycle (WSC) system operatively coupled to the HRSG and the ST system; and a piping layout for the WSC system, the piping layout including:

a first steam flow pipe delivering the steam from the HRSG to the HP segment of the ST system; and a second steam flow pipe delivering the steam from the HRSG to the IP segment of the ST system, wherein the first steam flow pipe includes a first vertically oriented thermal expansion portion entering a first admission valve of the HP segment, the first vertically oriented thermal expansion portion includes at least a first plurality of three sharp angle turns connecting a first horizontal portion of the first vertically oriented thermal expansion portion to a first vertical portion of the first vertically oriented thermal expansion portion to a second horizontal portion of the first vertically oriented thermal expansion portion and then to a second vertical portion of the first vertically oriented thermal expansion portion immediately upstream of the first admission valve;

wherein the second steam flow pipe includes a second vertically oriented thermal expansion portion entering a second admission valve of the IP segment and a third vertically oriented thermal expansion portion entering a third admission valve of the IP segment, wherein the second vertically oriented thermal expansion portion includes at least a second plurality of three sharp angle turns connecting a third horizontal portion of the second vertically oriented thermal expansion portion to a third vertical portion of the second vertically oriented thermal expansion portion to a fourth horizontal portion of the second vertically oriented thermal expansion portion and then to a fourth vertical portion of the second vertically oriented thermal expansion portion immediately upstream of the second admission valve;

wherein the third vertically oriented thermal expansion portion includes at least a third plurality of three sharp angle turns connecting a fifth horizontal portion of the third vertically oriented thermal expansion portion to a fifth vertical portion of the third vertically oriented thermal expansion portion to a sixth horizontal portion of the third vertically oriented thermal expansion portion and then to a sixth vertical portion of the third vertically oriented thermal expansion portion immediately upstream of the third admission valve; and wherein the second, fourth, and sixth vertical portions enter the first, second, and third admission valves, respectively, from vertically above.

12. The CCPP of claim 11, wherein each of the first and second steam flow pipes fluidly couple to receive the steam from the HRSG at a respective outlet; and further comprising:

wherein at least one of the first and second steam flow pipes includes a fourth vertically oriented thermal expansion portion immediately downstream from the respective outlet of the HRSG.

* * * * *